United States Patent
Runge et al.

(10) Patent No.: US 6,904,934 B2
(45) Date of Patent: Jun. 14, 2005

(54) PROPORTIONAL PRESSURE ADJUSTMENT VALVE

(75) Inventors: Wolfgang Runge, Ravensburg (DE); Hubert Remmlinger, Friedrichshafen (DE); Karlheinz Mayr, Bregenz (DE); Wolfgang Schmid, Langenargen (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/239,104

(22) PCT Filed: Jul. 13, 2001

(86) PCT No.: PCT/EP01/08103

§ 371 (c)(1),
(2), (4) Date: Sep. 19, 2002

(87) PCT Pub. No.: WO02/06911

PCT Pub. Date: Jan. 24, 2002

(65) Prior Publication Data

US 2003/0037825 A1 Feb. 27, 2003

(30) Foreign Application Priority Data

Jul. 19, 2000 (DE) ............................... 100 34 959

(51) Int. Cl.$^7$ ............................................. F15B 13/044
(52) U.S. Cl. ................................................ 137/596.17
(58) Field of Search ................ 137/596.17; 251/129.14

(56) References Cited

U.S. PATENT DOCUMENTS 2,868,494 A * 1/1959 Kearns et al. ......... 251/129.14
4,338,966 A * 7/1982 Smith .................... 137/596.17
5,410,943 A 5/1995 Kervagoret .................. 91/459
6,328,065 B1 * 12/2001 Schmid et al. ......... 137/596.17
6,418,967 B1 * 7/2002 Frei et al. .............. 137/596.17
2002/0053362 A1 5/2002 Frei et al. .............. 137/596.17

FOREIGN PATENT DOCUMENTS

DE    44 26 152 A1    3/1996
DE    199 43 066 A1    3/2000
WO    98/48332    10/1998

OTHER PUBLICATIONS

Backe, Prof. Dr.–Ing W., "Umdruck zur Vorlesung", Institut für hydraulische und pneumatische Antriebe under Steuerungen der RWTH Aachen, 1986, pp. 6–9.

* cited by examiner

Primary Examiner—Gerald A. Michalsky
(74) Attorney, Agent, or Firm—Davis & Bujold, P.L.L.C.

(57) ABSTRACT

A proportional pressure adjustment valve is described which comprises one valve part with inlet and outlet openings (4) and at least one closing mechanism (7) for control of a valve (12), the same as a magnet part having one magnet core, one magnet coil and one displaceably disposed magnet armature. An actuating element (11) cooperates with the armature, actuating the spherical closing mechanism (7). The hydraulically active cross section of the valve (12) is essentially determined by the length of the valve (L), the diameter of the valve (D) and th diameter (d) of the part (13) of the actuating element (11) which penetrates into the valve. According to invention, the ratio of the length of the valve (L) to the diameter of the valve (d) is less than 2.0.

13 Claims, 4 Drawing Sheets

PROPORTIONAL PRESSURE ADJUSTMENT VALVE

FIELD OF THE INVENTION

This invention concerns a proportional pressure adjustment valve comprising one valve part with inlet and outlet openings and at least one closing means to control a valve on one of the openings, the same as a magnet part with a magnet core, a magnet coil and a displaceably arranged magnet armature. Together with the armature operates an actuating element which controls the closing means, especially on the valve on the inlet opening, the actuating element penetrating at least partly into the valve during the adjustment process. The hydraulically active cross section of the valve is here essentially determined by the valve length, the valve diameter and the diameter of the actuating element in the valve.

BACKGROUND OF THE INVENTION

One such valve is known, for example, from WO 98/48332. This valve is equipped with at least two valve steps of which two steps are coupled with each other variably and under mechanical or hydraulic action according to the principle of the hydraulic half bridge. Both variable valve steps are provided as inlet and as outlet valves of a pressure adjustment space and each has one closing body of defined geometry.

DE 44 26 152 A1 describes an electromagnetic pressure adjustment valve which can be used especially for the shifting pressure adjustment of automatic transmission of motor vehicles. The valve has one valve housing and one control slide actuatable by a magnet armature and connected therewith, the slide controlling the connections from a pressure medium inlet to a consumption terminal or to a reverse flow tank. The control slide is supported in a rear end and in a front bearing point in the valve housing and is prestressed via a setting spring.

Proportional pressure adjustment valves of the above mentioned kind are subject to a permanent further development relative to the functional properties, especially the optimizing of the hydraulic properties, the same as the increase in the reliability of the operation under differing conditions.

The problem on which this invention is based is to show a proportional pressure adjustment valve with improved hydraulic properties which, in particular, has a flow-rate optimized valve, which has substantially less drags especially in the range of lower temperatures, that is, under high viscosities of the hydraulic fluid.

On the basis of a proportional pressure adjustment of the above mentioned kind, this problem is solved with the features stated in claim 1. Advantageous developments are described in the sub-claims.

SUMMARY OF THE INVENTION

According to the invention, the proportional pressure adjustment valve has an optimized definition of the supply geometry determinant of the flow rate, the ratio of the valve length to the valve diameter being less than 2.0 and said flow-rate determinant valve being especially situated in the inlet opening of the valve. It is thus advantageously obtained that the inventive valve has small flow losses, especially in the presence of high oil viscosities, that is, at low temperatures. Thereby are achieved higher flow rates and shorter response times of the valve so that the inventive design of the proportional pressure adjustment valve advantageously makes better dynamic values possible.

In an advantageous development of the invention, it is propose that the actuating element has a pin-shaped end piece which penetrates in the valve, it being also possible for part of the closing means to penetrate in the valve instead of the actuating element. The ratio of the diameter of the actuating element in the valve to the valve diameter is less than 0.9 and the diameter of the pin-shaped end piece of the actuating element is less than 1.0 mm. With such a design of the inlet-side valve an improved operation, especially for the pressure adjustment in automatic transmissions of motor vehicles, is advantageously provided.

In one other design of the invention is described a flow-favored definition of the edges on the inlet and outlet sides on the valve. Here the radii and/or the chamfers of the valve and/or on the end piece of the actuating element corresponding to the valve are made shorter than the valve length itself, the radii having a value of less than or equal to 0.1 time the valve length. Thereby are likewise made possible substantially lower drags of the valve geometry determinant of the flow rate.

The proportional pressure adjustment valve has a valve part with two seat valves, one seat valve particularly containing as closing means one ball and the other seat valve being designed as flat seat. Thereby is advantageously achieved that, with few demands on the precision of the individual parts, the inventive valve ensures a relatively great tightness especially in its end positions whereby the leakage characteristics are also minimized in a flow-rate optimized valve.

In a special development of the invention, which can also represent an independent invention, it is proposed that between both seat valves an additional perforated valve be placed which now represents, instead of the inlet-side valve, the flow-rate determining cross section between the inlet opening and an outlet opening. With such perforated valve, there are obtained substantially weaker drags, especially in the minus temperature range. The perforated valve described is advantageously more exact and easier to produce than then aforementioned annular valve. With a pressure adjuster thus optimized with regard to operation higher flow rates and shorter response times can be achieved and the dynamic values of the adjuster are improved. There is further ruled out the inflow due to a possible eccentricity of the pin-shaped end of the actuating element in the valve.

Between the inlet-side seat valve and the perforated valve, a space apt to be made fluid-tight is provided which can be produced, for example, by an annular sealing body made of flexible material.

A hydraulic connection to the working pressure line is provided between the perforated valve and the outlet opening or the seat valve on the tank side so that the working pressure line can be advantageously disposed in radial and axial direction in the valve body.

When implementing such a perforated valve, the external diameter of the aforementioned annular valve in the inlet opening is enlarged so that the flow-rate determining cross section is purposefully displaced in the perforated valve. Due to the enlargement of the external diameter of the annular valve, the minimum opening force is increased whereby an opening force impact can occur when the annular valve opens. To dampen said opening force impact of the inlet-side seat valve, it is proposed to provide a spring, especially a compression spring, between the magnet core and the magnet armature.

With an inventive proportional pressure adjustment valve, it is possible to carry out both a shifting and an adjusting operation in adapted design of the magnet part. Two kinds of operation are thus advantageously possible with one valve.

Other objectives, advantages and developments of the invention result from the description that follows of the embodiments shown in more detail in the figures. At the same time all the features and characteristics described and/or graphically shown are object of the invention separately or in arbitrary, logical combinations independently of their summarization and references in the claims.

BRIEF DESCRIPTION OF THE DRAWINGS

The invention will now be described, by way of example, with reference to the accompanying drawings in which.

DETAILED DESCRIPTION OF THE INVENTION

Figure 1:
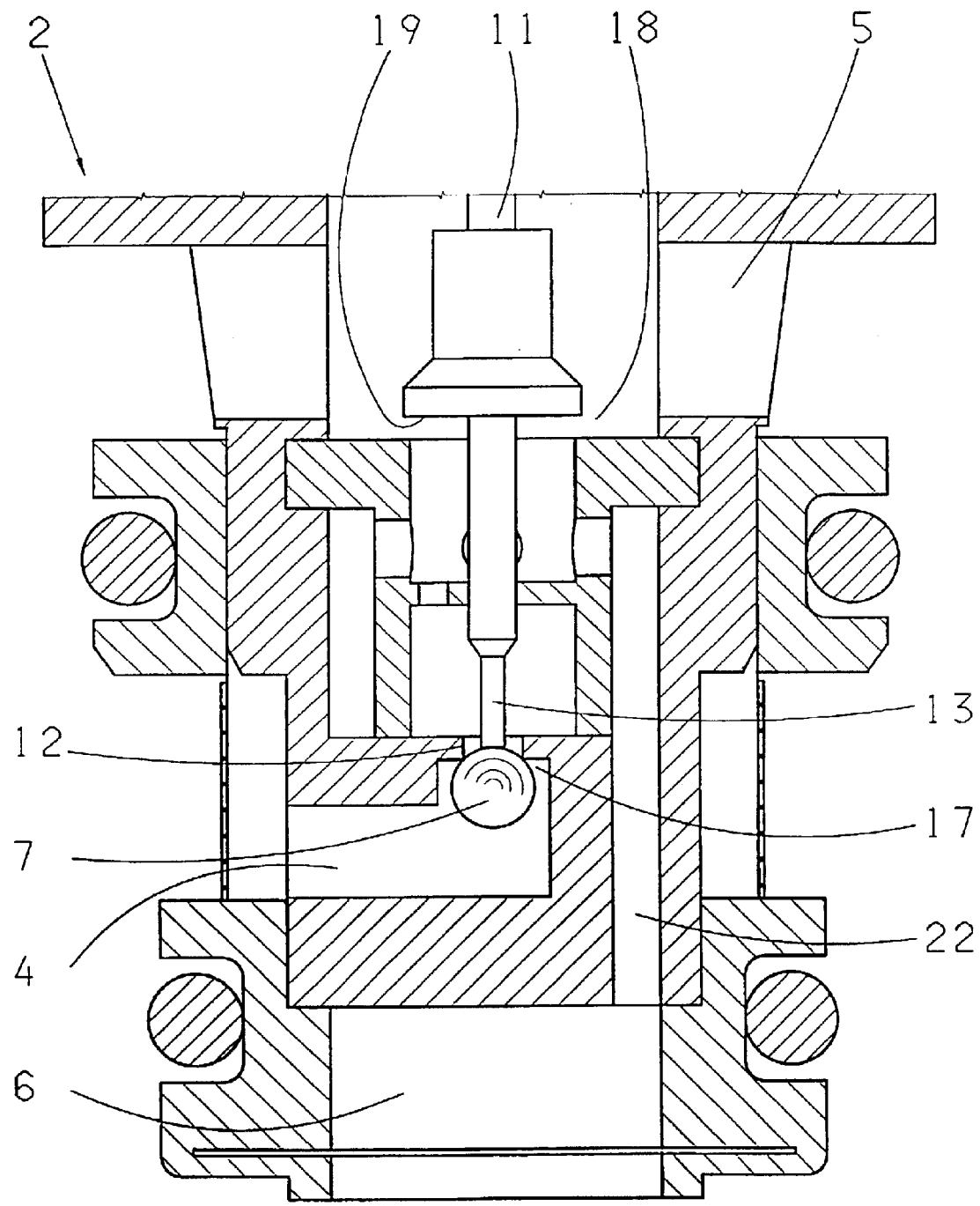
FIG. 1 shows in section a valve part for an inventive proportional pressure adjustment valve with closed inlet valve.

The valve part 2 (FIG. 2) has an inlet opening 4, a tank-side outlet opening 5 and a working pressure connection 6. The valve part 2 is also equipped with an inlet-side first seat valve 17 and an outlet-side seat valve 18. The closing means of the first seat valve 17 is designed as ball 7 which controls the inlet-side valve 12. The outlet-side seat valve 18 is provided with a flat seat 19 which can be operated via the actuating element 11 by a magnet armature shown in FIG. 4. The actuating element 11 has a pin-shaped end piece 13 which operates the closing means 7 in the inlet-side valve 12. The actuating element 11 is dimensioned so that the two seat valves 17 and 18 are crossed with each other according to the principle of a hydraulic half bridge. The inlet-side seat valve 17, for example, is closed here while the outlet-side seat valve 18 is open. In the space between the first and the second seat valves 17 and 18 is situated a hydraulic connection 22 to the working pressure line 6.

In the opposite end position (FIG. 2), the inlet-side seat valve 17 is fully open while the outlet-side seat valve 18 is closed. (In the figures the same parts have been identified with the same number). The pin-shaped end piece 13 of the actuating element 11 penetrates the valve 12 and lifts the spherical closing element 7 from its annular sealing surface. The pressure medium flowing in through the inlet opening 4 reaches through the valve 12 a space between both valve seats 17 and 18. The pressure medium is here deflected and led through the hydraulic connection 22 to the working pressure line 6.

The inlet-side valve 12 (FIG. 3) has on its inlet side a radius 14 and also a chamfer 16 on its outlet side. The front side of the pin-shaped end piece 13 of the actuating element 11 is likewise provided with a radius 15. In an advantageous embodiment of a proportional pressure adjustment valve for use as shift valve in an automatic transmission of a motor vehicle, the diameter of the ball 7 amounts to 1.588 mm while the diameter of the corresponding valve 12 amounts to 1.20 mm. The diameter d of the pin-shaped end piece 13 amounts to 0.60 mm and the valve length L to 0.50 mm. The inlet-side radius 14 of the valve 12 amounts to 0.05, the radius 15 on the end piece 13 amounts to 0.02 mm and the chamfer 16 is designed with 0.20 time 45°.

In an alternative design (FIG. 4) is shown a proportional pressure adjustment valve 1 comprised of a valve part 2 and a magnet part 3. The magnet part 3 essentially consists of one magnet core 8, one magnet coil 9 and one displaceably, disposed magnet armature 10 which interacts with the actuating element 11. Between the magnet core 8 and the armature 19, a compression spring 23 is provided for damping a force impact during opening of the inlet-side seat valve. The magnet part 3 can be attached via an electric feed line 24.

Figure 2:
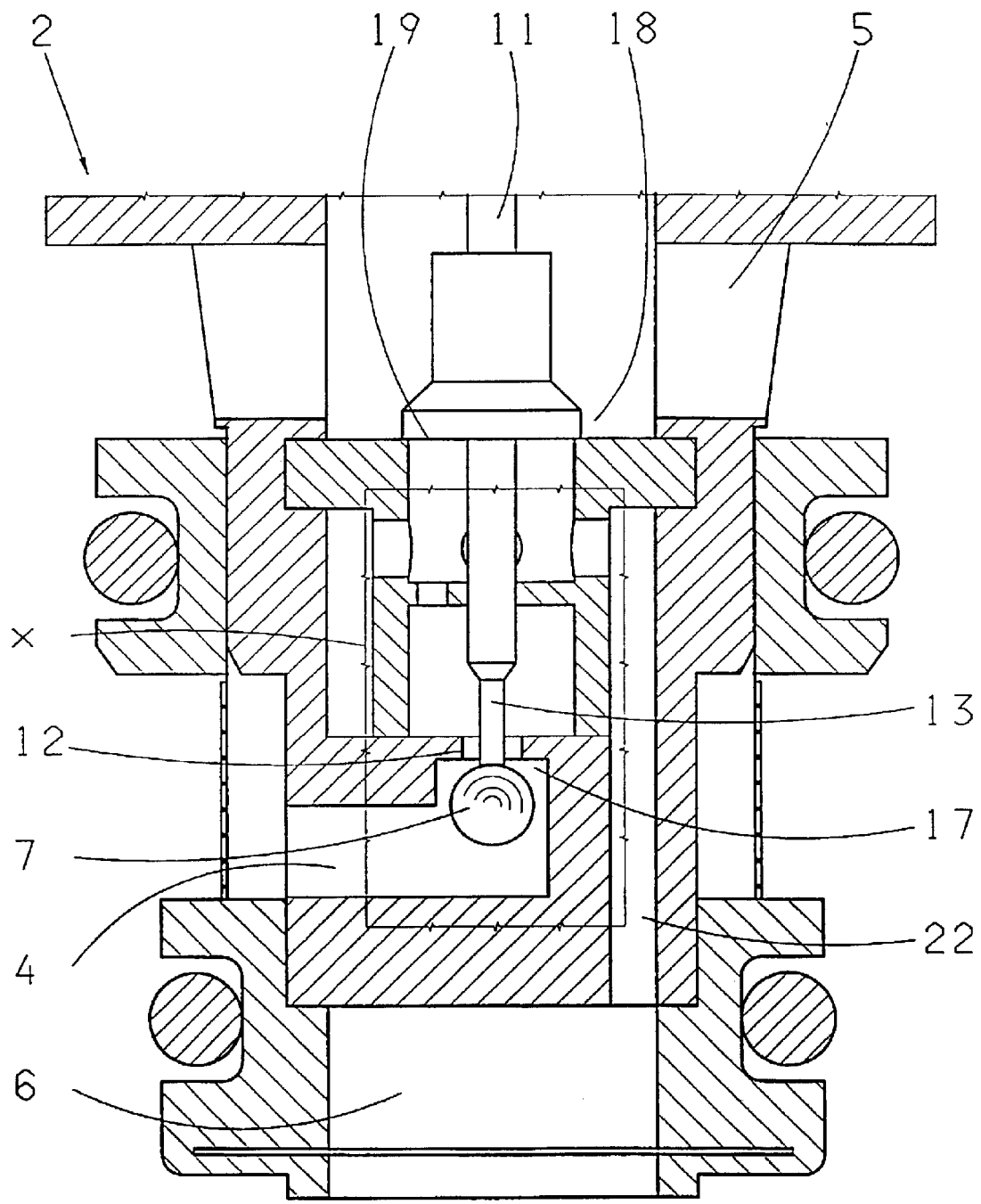
FIG. 2 shows the valve part according to FIG. 1 with open inlet valve.
Figure 3:
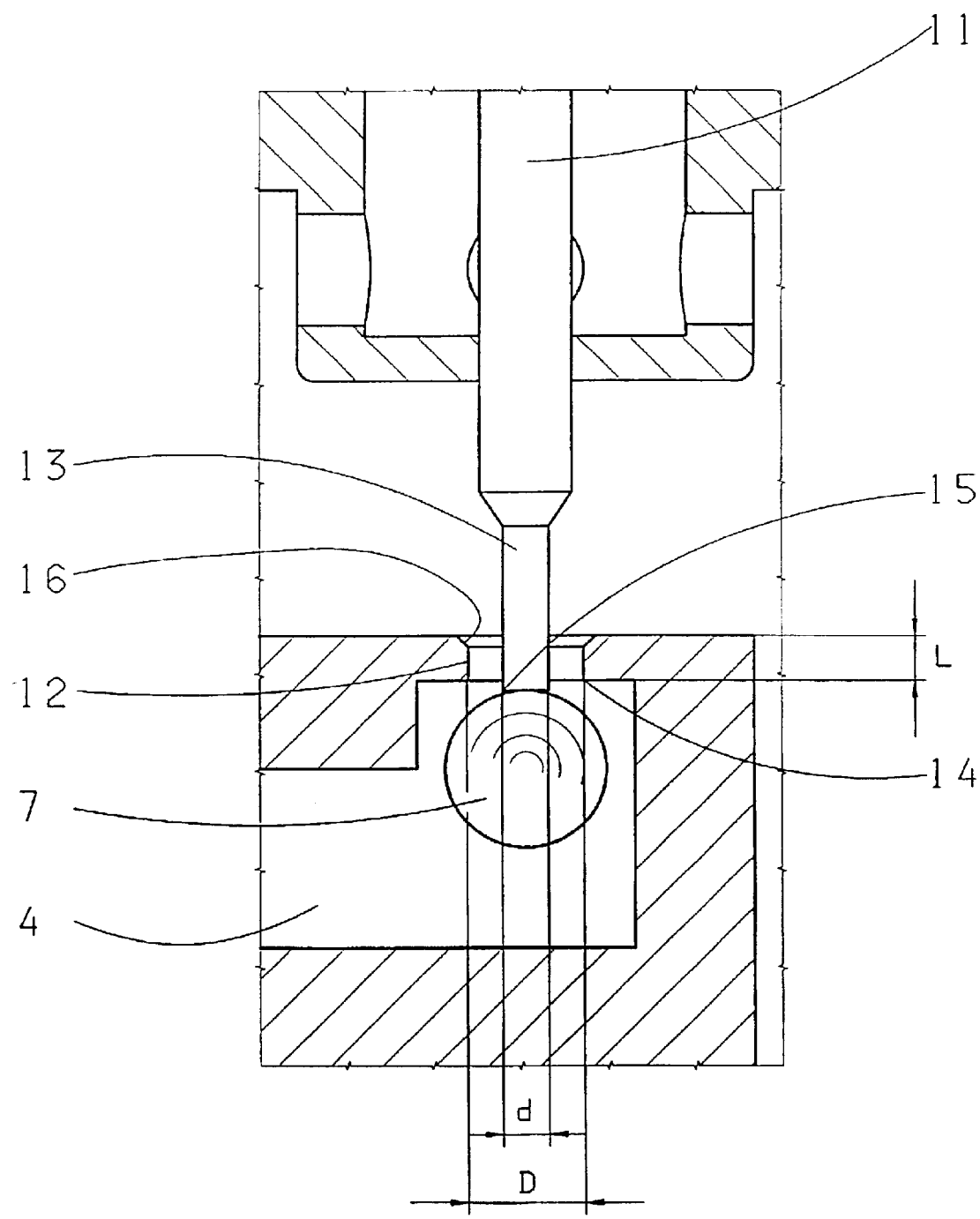
FIG. 3 shows an enlarged detail X from FIG. 2.

The basic construction of the valve part 2 is similar to the above described parts but has an inlet opening 4 in communication with a pressure line P, the same as an outlet opening 5 in communication with a tank T and a terminal 6 in communication with a working pressure line A. Between the inlet-side seat valve 17 and the outlet-side valve 18, a perforated valve is provided. In order that the perforated valve 20 forms the cross section of the valve part that determines the flow rate, the hole of the annular valve 12, compared with the valve shown in FIGS. 1 to 3, is slightly enlarged, for example, from about 0.30 mm to 0.50 mm in the outer diameter D. Such a perforated valve is more exact and easier to produce than the above described annular valves. Between the seat valve 17 and the perforated valve 20, the space 21 is delimited by an annular body 25 so that the pressure medium first has to flow through the perforated valve 20 in order to arrive at the hydraulic connection 22 to the working pressure line 6. To dampen an opening force impact possibly occurring due to the enlarged surface of the valve 20, a compression spring 23 is placed between the magnet core 8 and the magnet armature 10.

Figure 4:
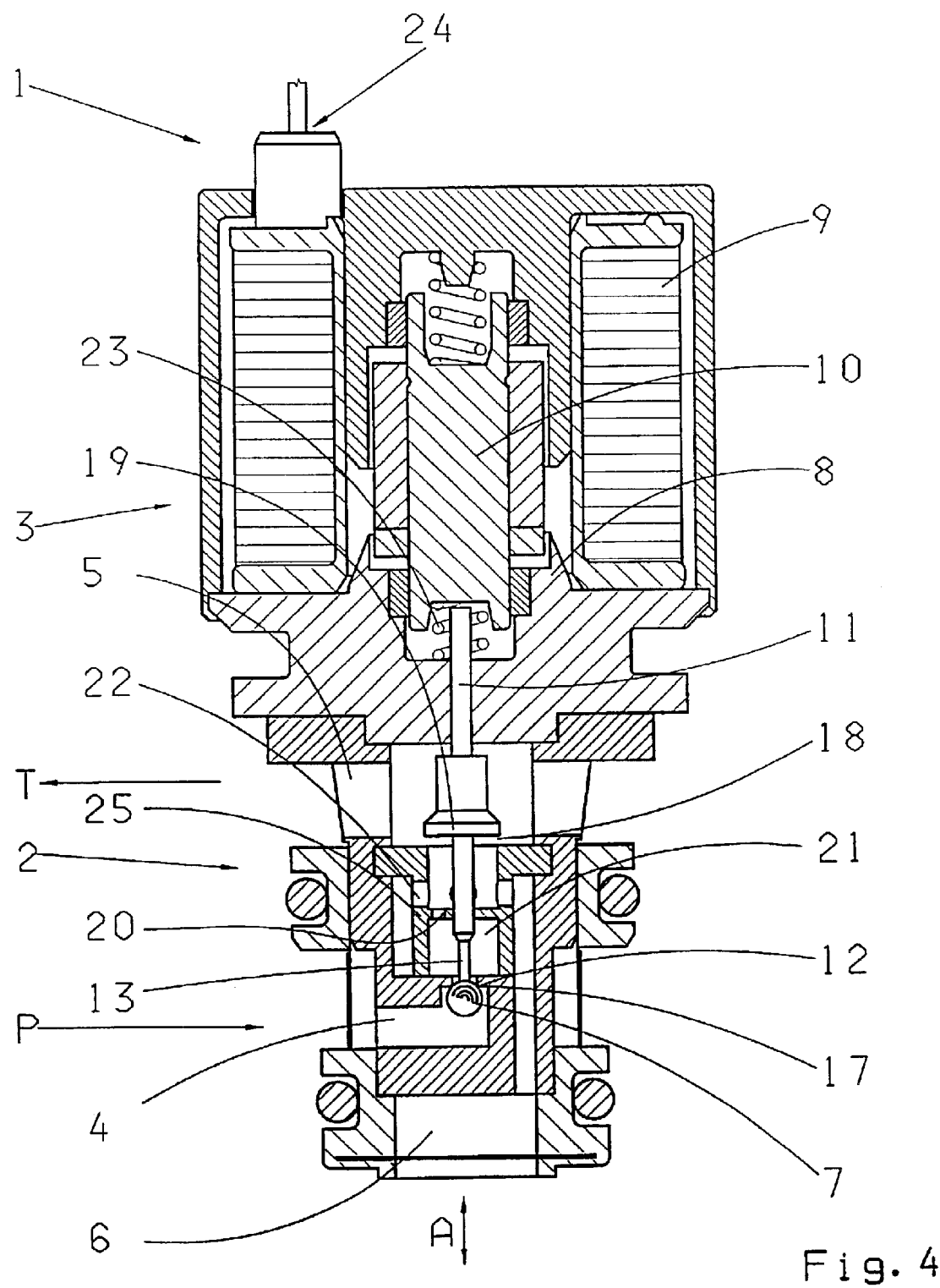
FIG. 4 shows in section and in reduced scale an inventive proportional pressure adjustment valve in another design.

In the end position, shown in FIG. 4, the inlet-side annular valve 12 is closed while the outlet-side seat valve 18 is open. In an inverse end position, not shown, of both seat valves the ball 7 is lifted from the seat of the valve 12 and the seat valve 18 is closed. The pressure medium thus arrives through the inlet opening 4 and via the annular valve 12 at the intermediate space 21. Thereafter the pressure medium flows through the perforated valve 20 determinant of the flow rate and the hydraulic connection 22 to the working pressure terminal 6.

| Reference numerals | | | |
|---|---|---|---|
| 1 | proportional pressure adjustment valve | 17 | seat valve |
| 2 | valve part | 18 | seat valve |
| 3 | magnet part | 19 | flat seat |
| 4 | inlet opening | 20 | perforated valve |
| 5 | outlet opening | 21 | space |
| 6 | working pressure line/connection | 22 | hydraulic connection |
| 7 | closing means (ball) | 23 | compression spring |
| 8 | magnet core | 24 | electric inlet |
| 9 | magnet coil | 25 | annular body |
| 10 | magnet armature | P | pressure line |
| 11 | actuating element | T | tank |
| 12 | annular valve | A | working pressure line |
| 13 | end piece (pin) | X | detail |
| 14 | radius | d | pin diameter |
| 15 | radius | D | valve diameter |
| 16 | chamfer | L | valve length |

What is claimed is:

1. A proportional pressure adjustment valve (1) comprising:
   a valve part (2) with inlet and outlet openings (4, 5, 6) and at least one closing mechanism (7) for control of a valve (12) interacting with one of said inlet and outlet openings,
   a magnet part (3) with a magnet core (8), a magnet coil (9) and a displaceably disposed magnet armature (10); and
   an actuating element (11) which interacts with said armature (10) for controlling operation of the closing mechanism (7);
   wherein a hydraulically active cross-section of said valve (12) is determined by a valve length (L), a valve diameter (D) and a diameter (d) of a pin-shaped end piece (13) of said actuating element (11) that penetrates into said valve; and
   a ratio of said valve length (L) to said valve diameter (D) is less than 2.0.

2. The proportional pressure adjustment valve according to claim 1, wherein the ratio of said diameter (d) of the pin-shaped end piece (13) of said actuating element (11) in said valve (12) to the valve diameter (D) is less than 0.9 and the diameter (d) is less than 1.0 mm.

3. The proportional pressure adjustment valve according to claim 1, further comprising at least one of a first edge radius, chamfer radius formed on said valve (12) and a second edge radius formed on said pin-shaped end piece (13) of said actuating element (11) corresponding with said valve (12) and wherein at least the first and second edge radii are smaller than the valve length (L), having a value below or equal to 0.1 times the valve length (L).

4. The proportional pressure adjustment valve according to claim 1, wherein the valve (12) is a first valve and said valve part (2) has first and second valves, the first valve (12) has a ball (7) as the closing mechanism (7) and the second valve (18) having a flat seat (19).

5. The proportional pressure adjustment valve according to claim 1, wherein the proportional pressure adjustment valve provides both a shifting and an adjustment operation.

6. A proportional pressure adjustment valve (1) comprising:
   a valve part (2) with inlet and outlet openings (4, 5, 6) and at least one closing means (7) for control of a valve (12) associated with one of said openings,
   a magnet part (3) with a magnet core (8), a magnet coil (9) and a displaceably disposed magnet armature (10); and
   an actuating element (11) which interacts with said armature (10) to actuate said closing means (7),
   wherein a hydraulically active cross-section of said valve (12) is determined by a valve length (L), a valve diameter (D) and a diameter (d) of a part of said actuating element (11) that penetrates into said valve, and a ratio of said valve length (L) to said valve diameter (D) is less than 2.0;
   the valve (12) is a first valve and the valve part (2) has the first valve and a second valve, the first valve (12) has a ball (7) as the closing means, and the second valve (18) has a flat seat (19), and
   between said first and second valves (12, 18) is a perforated shutter (20) having a cross-section determinant of the flow rate between said inlet opening (4) and an outlet opening (5), particularly of a working pressure line (6).

7. The proportional pressure adjustment valve according to claim 6, wherein the first valve (12) is located between said inlet opening (4) and said perforated shutter (20) and a hydraulically sealable space (21) is provided between the first valve (12) and the perforated shutter (20).

8. The proportional pressure adjustment valve according to claim 6, wherein a hydraulic connection (22) to said working pressure line (6) is provided between said perforated shutter (20) and said second valve (18).

9. The proportional pressure adjustment valve according to claim 6, wherein a spring is provided, between said magnet core (8) and said magnet armature (10), to dampen any force impact during opening of the first valve (12).

10. A proportional pressure adjustment valve (1) comprising:
    a valve part (2) with inlet and outlet openings (4, 5, 6) and at least one closing mechanism (7) for control of a valve (12) interacting with one of said inlet and outlet openings,
    a magnet part (3) with a magnet core (8), a magnet coil (9) and a displaceably disposed magnet armature (10); and
    an actuating element (11), operably coupled to open the closing mechanism (7), which interacts with said armature (10) for controlling operation of the closing mechanism (7);
    a hydraulically active passage of said valve (12) having a valve length (L), a valve diameter (D) and a diameter (d) of a pin-shaped end piece (13) of said actuating element (11) that penetrates into said valve, and
    wherein said valve length (L) is less than one-half (0.5) said valve diameter (D), and said diameter (d) of the pin shaped end piece (13) is greater than the valve length (L) of the valve.

11. The proportional pressure adjustment valve according to claim 10, wherein said diameter (d) of the pin-shaped end piece (13) of said actuating element (11) is less than 1.0 mm.

12. The proportional pressure adjustment valve according to claim 10, wherein at least one of a first edge radii (14), a chamfer (16) on said valve (12) and a second radii (15) on said pin shaped end piece (13) of said actuating element (11) corresponding with said valve (12), are smaller than the valve length (L), and at least the first and second radii having a value below or equal to 0.1 times the valve length (L).

13. The proportional pressure adjustment valve according to claim 10, wherein the valve (12) is a first valve and the valve part (2) has first and second valves, the first valve (12) has a ball (7) as the closing mechanism (7) and the second valve (18) having a flat seat (19).

* * * * *